United States Patent
Lee et al.

(10) Patent No.: US 9,659,189 B2
(45) Date of Patent: May 23, 2017

(54) SYSTEMS AND METHODS OF SAFEGUARDING USER INFORMATION WHILE INTERACTING WITH ONLINE SERVICE PROVIDERS

(71) Applicant: Georgia Tech Research Corporation, Atlanta, GA (US)

(72) Inventors: Wenke Lee, Atlanta, GA (US); Alexandra Boldyreva, Atlanta, GA (US); Chung Pak Ho, Atlanta, GA (US); Billy Lau, Atlanta, GA (US); Chengyu Song, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 147 days.

(21) Appl. No.: 14/513,680

(22) Filed: Oct. 14, 2014

(65) Prior Publication Data

US 2015/0106614 A1    Apr. 16, 2015

Related U.S. Application Data

(60) Provisional application No. 61/890,513, filed on Oct. 14, 2013.

(51) Int. Cl.
*G06F 21/62* (2013.01)
*H04W 12/00* (2009.01)
(Continued)

(52) U.S. Cl.
CPC ...... *G06F 21/6263* (2013.01); *H04L 63/0435* (2013.01); *H04W 12/00* (2013.01); *H04W 12/02* (2013.01); *H04W 88/02* (2013.01)

(58) Field of Classification Search
CPC ............ G06F 21/6263; H04L 63/0435; H04L 9/0877; H04L 9/3247; H04L 9/3231;
(Continued)

(56) References Cited

U.S. PATENT DOCUMENTS

| | | | | |
|---|---|---|---|---|
| 2010/0241847 A1* | 9/2010 | van der Horst | ......... | H04L 12/58 713/152 |
| 2012/0314865 A1* | 12/2012 | Kitchen | ................ | H04L 9/0877 380/270 |
| 2014/0075518 A1* | 3/2014 | D'Souza | ................. | H04L 63/00 726/4 |

OTHER PUBLICATIONS

Peek, D., and Flinn, J. Trapperkeeper: the case for using virtualization to add type awareness to file systems. In Proceedings of the 2nd USENIX conference on Hot topics in storage and file systems (2010), USENIX Association, pp. 8-8.

(Continued)

*Primary Examiner* — Saleh Najjar
*Assistant Examiner* — Shu Chun Gao
(74) *Attorney, Agent, or Firm* — Troutman Sanders LLP; Ryan A. Schneider

(57) ABSTRACT

The disclosed technology includes techniques for improving data privacy in mobile communications over public cloud services. According to certain implementations, a novel conceptual layer may be interposed between the "application" layer and the "user" layer. In some implementations, the conceptual layer may be at least partially embodied by a transparent window or pane overlaid on top of existing app graphical user interfaces to: (1) intercept plaintext user input before transforming the input and feeding it to an underlying app; and (2) reverse transform output data from the app before displaying the plaintext data to the user. Accordingly, the conceptual layer may serve as a protective layer while preserving the original application workflow and look-and-feel.

20 Claims, 8 Drawing Sheets

(51) Int. Cl.
H04L 29/06 (2006.01)
H04W 12/02 (2009.01)
H04W 88/02 (2009.01)

(58) Field of Classification Search
CPC .. H04L 63/166; H04L 63/0823; H04W 12/02; H04W 12/00; H04W 88/02
See application file for complete search history.

(56) References Cited

OTHER PUBLICATIONS

Roesner, F., Kohno, T., Moshchuk, A., Parno, B., Wang, H. J., and Cowan, C. User-driven access control: Rethinking permission granting in modern operating systems. In Security and Privacy (SP), 2012 IEEE Symposium on (2012), IEEE, pp. 224-238.
Shah, K. Common Mobile App Design Mistakes to Take Care. http://www.enterprisecioforum.com/en/blogs/kaushalshah/commonmobile-app-design-mistakes-take-c.
Sheng, S., Broderick, L., Hyland, J., and Koranda, C. Why Johnny still can't encrypt: evaluating the usability of email encryption software. In Symposium on Usable Privacy and Security (2006).
Song, D. X., Wagner, D., and Perrig, A. Practical techniques for searches on encrypted data. In IEEE Symposium on Security and Privacy (2000), pp. 44-55.
Tsunoo, Y., Saito, T., Suzaki, T., Shigeri, M., and Miyauchi, H. Cryptanalysis of des implemented on computers with cache. In Cryptographic Hardware and Embedded Systems—CHES 2003. Springer, 2003, pp. 62-76.
US-CERT/NIST. Cve-2013-4787. http://web.nvd.nist.gov/view/vuln/detail?vulnld=CVE-2013-4787.
Whittaker, S., Matthews, T., Cerruti, J., Badenes, H., and Tang, J. Am i wasting my time organizing email?: a study of email refinding. In Part 5—Proceedings of the 2011 annual conference on Human factors in computing systems (2011), ACM, pp. 3449-3458.
Whitten, A., and Tygar, J. D. Why Johnny cant encrypt: A usability evaluation of pgp 5.0. In Proceedings of the 8th USENIX Security Symposium (1999), vol. 99, McGraw-Hill.
Wojtczuk, R., and Tereshkin, A. Attacking intelR bios. Invisible Things Lab (2010).
WU, C., Zhou, Y., Patel, K., Liang, Z., and Jiang, X. Airbag: Boosting smartphone resistance to malware infection. In NDSS (2014).
Xu, R., Sa''Idi, H., and Anderson, R. Aurasium: Practical policy enforcement for android applications. In Proceedings of the 21st USENIX conference on Security symposium (2012), USENIX Association, pp. 27-27.
Accessibility. http://developer.android.com/guide/topics/ui/ accessibility/index.html.
Cisco Visual Networking Index: Global Mobile Data Traffic Forecast Update, 2013-2018. http://www.cisco.com/c/en/us/solutions/collateral/serviceprovider/ visual-networking-index-vni/white paper c11- 520862.html.
Cryptocat. https://crypto.cat.
Engineering Security Solutions at Layer 8 and Above. https://blogs.rsa.com/engineering-security-solutions-at-layer-8-and-above/, December.
Gibberbot for Android devices. https://securityinabox.org/en/Gibberbot main.
Google Accessibility. https://www.google.com/accessibility/policy/.
Google Chrome Mobile FAQ. https://developers.google.com/chrome/mobile/docs/faq.
International technology—Open Systems Interconnection—Basic Reference Model: The Basic Model. http://www.ecmainternational.org/activities/Communications/TG11/s020269e.pdf.
Microsoft Accessibility. http://www.microsoft.com/enable/microsoft/ section508.aspx.
New privacy fears as facebook begins selling personal access to companies to boost ailing profits. http://www.dailymail.co.uk/news/article-2212178/Newprivacy-row-Facebook-begins-selling-access-users-boostailing-profits.html.
Secure texts for Android. https://whispersystems.org.
Snowden: Leak of NSA spy programs "marks my end". http://www.cbsnews.com/8301-201 162-57588462/snowdenleak-of-nsa-spy-programs-marks-my-end/.
Symantec desktop email encryption end-to-end email encryption software for laptops and desktops. http://www.symantec.com/desktop-email-encryption.
Ten Mistakes That Can Ruin Customers' Mobile App Experience. http://www.itbusinessedge.com/slideshows/show.aspx?c=96038.
UI Testing—Android Developers. http://developer.android.com/tools/testing/ testing_ui.html.
Layer 8 Linux Security: OPSEC for Linux Common Users, Developers and Systems Administrators. http://www.linuxgazette.net/164/kachold.html, Jul. 2009.
Accessibility. https://www.apple.com/accessibility/resources/, Feb. 2014.
107th Congress. Uniting and strengthening america by providing appropriate tools required to intercept and obstruct terrorism (usa patriot act) of 2001. Public Law 107-56 (2001).
Acquisti, A., and Gross, R. Imagined communities: Awareness, information sharing, and privacy on the facebook. In Privacy enhancing technologies (2006), Springer, pp. 36-58.
Baden, R., Bender, A., Spring, N., Bhattacharjee, B., and Starin, D. Persona: an online social network with userdefined privacy. In ACM SIGCOMM Computer Communication Review (2009), vol. 39, ACM, pp. 135-146.
Beato, F., Kohlweiss, M., and Wouters, K. Scramble! your social network data. In Privacy Enhancing Technologies (2011), Springer, pp. 211-225.
Bellare, M., Boldyreva, A., and O'Neill, A. Deterministic and efficiently searchable encryption. In CRYPTO (2007), A. Menezes, Ed., vol. 4622 of Lecture Notes in Computer Science, Springer, pp. 535-552.
Berthome, P., Fecherolle, T., Guilloteau, N., and Lalande, J.-F. Repackaging android applications for auditing access to private data. In Availability, Reliability and Security (ARES), 2012 Seventh International Conference on (2012), IEEE, pp. 388-396.
B''Ohmer, M., Hecht, B., Sch''O Ning, J., Kr''Uger, A., and Bauer, G. Falling asleep with angry birds, facebook and kindle: a large scale study on mobile application usage. In Proceedings of the 13th international conference on Human computer interaction with mobile devices and services (2011), ACM, pp. 47-56.
Boneh, D., Crescenzo, G. D., Ostrovsky, R., and Persiano, G. Public key encryption with keyword search. In EUROCRYPT (2004), C. Cachin and J. Camenisch, Eds., vol. 3027 of Lecture Notes in Computer Science, Springer, pp. 506-522.
Borisov, N., Goldberg, I., and Brewer, E. Off-the-record communication, or, why not to use pgp. In Proceedings of the 2004 ACM workshop on Privacy in the electronic society (2004), ACM, pp. 77-84.
Chang, Y.-C., and Mitzenmacher, M. Privacy preserving keyword searches on remote encrypted data. In Applied Cryptography and Network Security, J. Ioannidis, A. Keromytis, and M. Yung, Eds., vol. 3531 of Lecture Notes in Computer Science. Springer, 2005, pp. 442-455.
Cohen, W. W. Enron email dataset. http://www.cs.cmu.edu/ enron, Aug. 2009.
Curtmola, R., Garay, J. A., Kamara, S., and Ostrovsky, R. Searchable symmetric encryption: Improved definitions and efficient constructions. In ACM Conference on Computer and Communications Security (2006), A. Juels, R. N. Wright, and S. D. C. di Vimercati, Eds., ACM, pp. 79-88.
Dingledine, R., Mathewson, N., and Syverson, P. Tor: The second-generation onion router. Tech. rep., DTIC Document, 2004.
Dong, X., Chen, Z., Siadati, H., Tople, S., Saxena, P., and Liang, Z. Protecting sensitive web content from clientside vulnerabilities with cryptons. In Proceedings of the 2013 ACM SIGSAC conference on Computer & communications security (2013), ACM, pp. 1311-1324.

(56) References Cited

OTHER PUBLICATIONS

Elkins, M. Mime security with pretty good privacy (pgp).
Enck, W., Gilbert, P., Chun, B.-G., Cox, L. P., Jung, J., McDaniel, P., and Sheth, A. Taintdroid: An informationflow tracking system for realtime privacy monitoring on smartphones. In OSDI (2010), vol. 10, pp. 1-6.
Fahl, S., Harbach, M., Muders, T., Baumg"A Rtner, L., Freisleben, B., and Smith, M. Why eve and mallory love android: An analysis of android ssl (in)security. In Proceedings of the 2012 ACM Conference on Computer and Communications Security (New York, NY, USA, 2012), CCS '12, ACM, pp. 50-61.
Fahl, S., Harbach, M., Muders, T., and Smith, M. Trustsplit: usable confidentiality for social network messaging. In Proceedings of the 23rd ACM conference on Hypertext and social media (2012), ACM, pp. 145-154.
Farb, M., Lin, Y.-H., Kim, T. H.-J., McCune, J., and Perrig, A. Safeslinger: easy-to-use and secure public-key exchange. In Proceedings of the 19th annual international conferenceon Mobile computing & networking (2013), ACM, pp. 417-428.
Faulkner, L. Beyond the five-user assumption: Benefits of increased sample sizes in usability testing. Behavior Research Methods, Instruments, & Computers 35,3 (2003), 379-383.
Feldman, A. J., Blankstein, A., Freedman, M. J., and Felten, E. W. : Social networking with frientegrity: privacy and integrity with an untrusted provider. In Proceedings of the 21st USENIX conference on Security symposium, Security (2012), vol. 12.
Goh, E.-J. Secure indexes. IACR Cryptology ePrint Archive (2003).
Goldreich, O., and Ostrovsky, R. Software protection and simulation on oblivious rams. J. ACM 43,3 (1996), 431-473.
Guha, S., Tang, K., and Francis, P. Noyb: Privacy in online social networks. In Proceedings of the first workshop on Online social networks (2008), ACM, pp. 49-54.
Henry, S. Largest hacking, data breach prosecution in U.S. history launches with five arrests. http://www.mercurynews.com/business/ci23730361/largesthacking-data-breach-prosecution-u-s-history, Jul. 2013.
Jang, Y., Chung, S. P., Payne, B. D., and Lee, W. Gyrus: A framework for user-intent monitoring of text-based networked applications. In NDSS (2014).
Jeon, J., Micinski, K. K., Vaughan, J. A., Fogel, A., Reddy, N., Foster, J. S., and Millstein, T. Dr. android and mr. hide: fine-grained permissions in android applications. In Proceedings of the second ACM workshop on Security and privacy in smartphones and mobile devices (2012), ACM, pp. 3-14.
Jiang, X. Gingermaster: First android malware utilizing a root exploit on android 2.3 (gingerbread). http://www.csc.ncsu.edu/faculty/jiang/ GingerMaster/.
Kamara, S., Papamanthou, C., and Roeder, T. Dynamic searchable symmetric encryption. In Proceedings of the 2012 ACM conference on Computer and communications security (2012), ACM, pp. 965-976.
King, S. T., Tucek, J., Cozzie, A., Grier, C., Jiang, W., and Zhou, Y. Designing and implementing malicious hardware. In Proceedings of the 1st USENIX Workshop on Large-Scale Exploits and Emergent Threats (Berkeley, CA, USA, 2008), LEET'08, USENIX Association, pp. 5:1-5:8.
Kontaxis, G., Polychronakis, M., Keromytis, A. D., and Markatos, E. P. Privacy-preserving social plugins. In Proceedings of the 21st USENIX conference on Security symposium (2012), USENIX Association, pp. 30-30.
Lucas, M. M., and Borisov, N. Flybynight: mitigating the privacy risks of social networking. In Proceedings of the 7th ACM workshop on Privacy in the electronic society (2008), ACM, pp. 1-8.

\* cited by examiner

FIG. 3

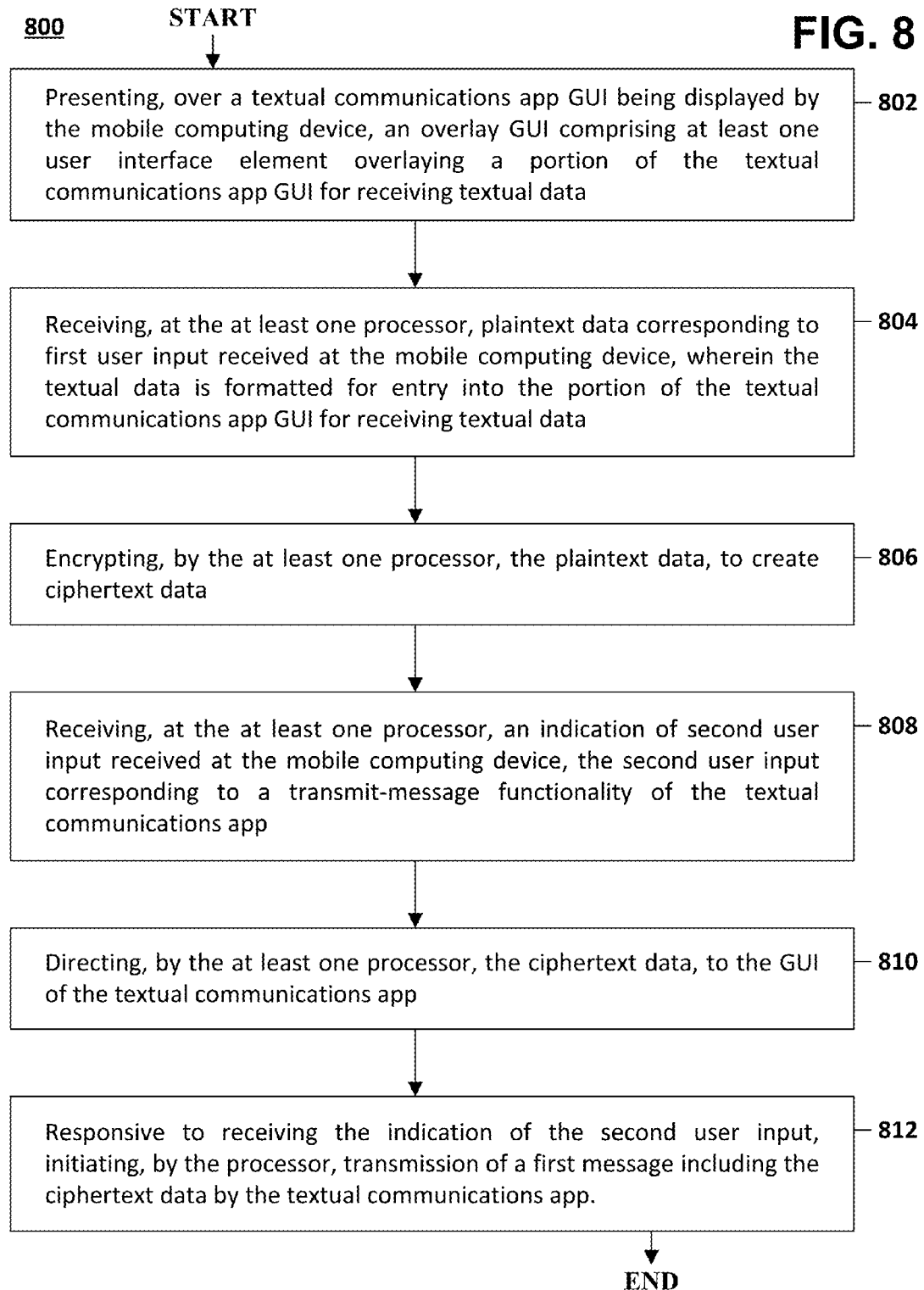

SYSTEMS AND METHODS OF SAFEGUARDING USER INFORMATION WHILE INTERACTING WITH ONLINE SERVICE PROVIDERS

CROSS-REFERENCE TO RELATED APPLICATIONS

This application claims priority to, and the benefit under 35 U.S.C. §119(e), of U.S. Provisional Patent Application No. 61/890,513, filed 14 Oct. 2013, the entire contents and substance of which are hereby incorporated by reference as if fully set forth below.

STATEMENT OF RIGHTS UNDER FEDERALLY-SPONSORED RESEARCH

The disclosed technology was made in part with U.S. Government support under Grant Nos. CNS-1017265, CNS-0831300, CNS-1149051, and CNS-1318511, awarded by the National Science Foundation; Grant No. N000140911042, awarded by the Office of Naval Research; Contract No. N66001-12-C-0133, awarded by the Department of Homeland Security; and Contract No. FA8650-10-C-7025, awarded by the United States Air Force. The U.S. Government has certain rights in the invention.

BACKGROUND

A growing number of users are utilizing mobile computing devices to access public cloud services (PCS) (e.g., Gmail™, Outlook®, and WhatsApp®) as an essential part of their daily lives. While mobile platforms may help improve a user's connectivity to the Internet, the issue of preserving data privacy while accessing PCS on mobile devices remains unsolved. Moreover, recent news about widespread governmental surveillance programs has brought to the forefront a very unsatisfactory status quo: while PCS have become an essential part of everyday life for many, conventional methods of accessing PCS expose users to privacy breaches because they implicitly require the users to trust the PCS providers with the confidentiality of user data. However, such trust is unjustified, if not misplaced. In many situations, PCS providers are bound by law to share their users' data with surveillance agencies. Moreover, it is the business model of many PCS providers to mine their users' data and share it with third parties. Further, operator error may result in unintended data leaks, and data servers may be compromised by attackers.

To alter this undesirable status quo, solutions should be designed based on an updated trust model of everyday communications that better reflects the reality of these threats. In particular, new solutions should assume PCS providers untrustworthy. This implies that all other entities controlled by the PCS providers—including the consumer apps that users install to engage with the PCS—should also be assumed untrustworthy.

SUMMARY

The above needs and others may be addressed by certain implementations of the disclosed technology. Certain implementations include techniques for improving data privacy in mobile communications over public cloud services.

According to an example implementation, a method is provided. The method may include receiving, at a processor, private data (which can be textual or multi-media) corresponding to first user input at an input device operatively coupled to the processor. The private data may be formatted for entry into a GUI of a data communications software running on a computing device. The GUI may be being displayed at a display device coupled to the processor. The method may further include, receiving, at the processor, an indication of second user input. The second user input may correspond to a transmit-message functionality of the data communications software. The method may yet further include transforming, by the processor, the private data, to create transformed private data. The method may still yet further include outputting, by the processor, the transformed private data, to the GUI of the data communications software. The method may also include, responsive to receiving the indication of the second user input, initiating, by the processor, transmission of the transformed private data by the data communications software.

According to an example implementation, another method is provided. The method may include presenting, over a textual communications app GUI being displayed by the mobile computing device, an overlay GUI. The overlay GUI may comprise at least one user interface element overlaying a portion of the textual communications app GUI for receiving textual data. The method may further include, receiving, at the at least one processor, plaintext data corresponding to first user input received at the mobile computing device. The textual data may be formatted for entry into the portion of the textual communications app GUI for receiving textual data. The method may yet further include encrypting, by the at least one processor, the plaintext data, to create ciphertext data. The method may still yet further include receiving, at the at least one processor, an indication of second user input received at the mobile computing device. The second user input may correspond to a transmit-message functionality of the textual communications app. The method may also include directing, by the at least one processor, the ciphertext data, to the GUI of the textual communications app. The method may further include, responsive to receiving the indication of the second user input, initiating, by the processor, transmission of a first message including the ciphertext data by the textual communications app According to another example implementation, a computer program product is provided. The computer program product may be embodied in a non-transitory computer-readable medium, and may store instructions that, when executed by at least one processor, causes the at least one processor to perform a method substantially similar the above-described methods.

According to another example implementation, a system is provided. The system may include at least one memory operatively coupled to at least one processor and configured for storing data and instructions that, when executed by the at least one processor, cause the system to perform a method substantially similar the above-described methods.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 3 depicts an illustration of an email app interface when the system is active 300A, and when the system is inactive 300B, respectively, according to an example implementation.

FIG. 8 depicts a flow diagram of another n method 800, according to an example implementation.

DETAILED DESCRIPTION

Figure 1:
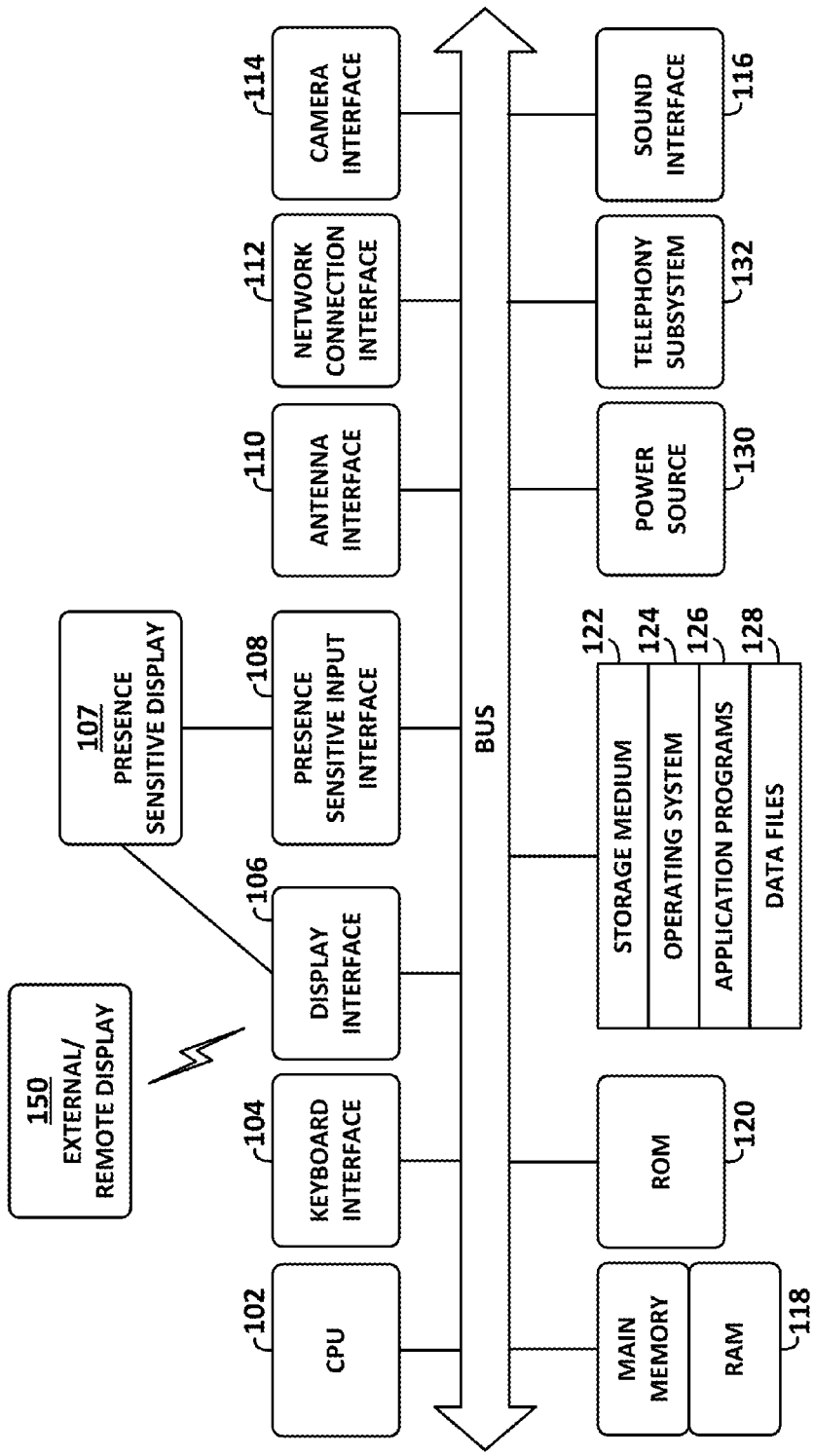
FIG. 1 depicts a block diagram of illustrative computing device architecture 100, according to an example implementation.

Users are increasingly storing, accessing, and exchanging data through public cloud services (PCS). Although many users rely on cloud providers to provide sufficient security protection, the confidentiality of data in public clouds may be violated by third parties, or PCS providers themselves. Consequently, PCS should not be trusted to ensure data privacy.

Implementations of the disclosed technology include novel techniques for improving data privacy in mobile communications over public cloud services. According to certain implementations, a new conceptual layer may be interposed between the "application" layer and the "user" layer. In some implementations, the conceptual layer may be at least partially embodied by a transparent window or pane overlaid on top of existing app graphical user interfaces (GUIs) to: (1) intercept plaintext user input before transforming the input and feeding it to an underlying app; and (2) reverse transform output data from the app before displaying the plaintext data to the user. Accordingly, the conceptual layer may serve as a protective layer while preserving the original application workflow and look-and-feel.

This approach may allow certain implementations to support true end-to-end encryption of user data with three goals in mind: (1) data and logic isolation from untrusted entities; (2) the preservation of original user experience with target apps; and (3) applicability to a large number of apps and resilience to app updates. Accordingly, some implementations may transparently integrate with cloud services without hindering usability and without the need to reverse engineer cloud service client apps.

Throughout this disclosure, certain implementations are described in exemplary fashion in relation to safeguarding data communications across public cloud services accessed from mobile platforms. However, implementations of the disclosed technology are not so limited. In some implementations, the disclosed technology may be effective in securing communications across private clouds and other services or networks, or securing communications sent from PC/desktop platforms. Moreover, certain implementations may be effective in securing the transmission of multimedia data, binaries, and other files in addition to text-based communications (collectively referred to herein as "private data").

Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a Wi-Fi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a PDA, satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for improving data privacy in mobile communications over public cloud services, and will now be described with reference to the accompanying figures.

FIG. 1 depicts a block diagram of illustrative computing device architecture 100, according to an example implementation. Certain aspects of FIG. 1 may be embodied in a computing device 200 (for example, a mobile computing device). As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain some implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example implementation, the computing device architecture 100 may include a presence-sensitive display interface 107 for connecting to a presence-sensitive display. According to certain some implementations of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system (OS) 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components. According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device may be coupled, connected, and/or in communication with one or more peripheral devices, such as display. In another example implementation, the term computing device, as used herein, may refer to a mobile computing device, such as a smartphone or tablet computer. In this example implementation, the computing device may output content to its local display and/or speaker(s). In another example implementation, the computing device may output content to an external display device (e.g., over Wi-Fi) such as a TV or an external computing system.

In some implementations of the disclosed technology, the computing device may include any number of hardware and/or software applications that are executed to facilitate any of the operations. In some implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi® enabled network, a satellite-based network any wired network, any wireless network, etc., for communication with external devices and/or systems, for example, via public cloud service.

Introduction

Many of the most popular mobile apps available today are communications apps facilitating text-based end-to-end communication services such as email, instant/IP messaging via various PCS providers. In an analogous fashion to mail carriers delivering letters, PCS providers may be considered content-agnostic message routers. That is, PCS providers may function normally without needing to know the content of the messages being delivered. Thus, users should be able to enjoy the same quality of service without needing to reveal their plaintext data to PCS providers. Thus, applying end-to-end encryption (E2EE) without assuming trust in the PCS providers would appear to mitigate vulnerabilities in PCS networks.

In practice, however, the direct application of E2EE solutions in the mobile device environment has proven challenging. A good solution should present clear advantages to the entire mobile security ecosystem. In particular, a robust solution should account for at least these factors: (1) the ease-of-use of the solution, and its corresponding effects on acceptability and adoptability; (2) the developers' efforts to maintain support for the solution, especially with a rapidly changing software ecosystem; and (3) the feasibility and deployability of the solution on a mobile system. In view of these factors, three design goals were formulated:

1. For a solution to be secure, it should be properly isolated from untrusted entities. E2EE cannot guarantee data confidentiality if plaintext data or an encryption key can be compromised through an architecture that risks exposing these values. Traditional solutions like PGP® and even more recent efforts like Gibberbot, TextSecure, and SafeSlinger may provide acceptable isolation, but force users to use custom apps (and corresponding UI and workflows), which may hinder adoption and cause usability problems.

Solutions that repackage or rewrite existing apps to introduce additional security checks or solutions in the form of browser plugins/extensions may avoid or mitigate these issues. However, conventional browser plugins/extensions generally do not fit into the mobile security landscape because many mobile browsers do not support extensions, and mobile device users do not favor using mobile browsers to access PCS. Thus, browser plugin/extension-based solutions are likely insufficient to meet the formulated goals.

2. For a solution to be adoptable, it should preserve the original user experience. Research suggests that users will not accept solutions that require them to switch between multiple apps to perform their daily tasks. Therefore, simply porting solutions like PGP to a mobile platform would not be effective, as PGP forces users to use a separate and custom app, and it would be infeasible to recreate the richness and unique user experience of all existing text routing apps offered by various PCS providers today. In the context of mobile devices, PCS are competing for market share not only based on functionality and reliability, but also user experience. Ultimately, many users will choose apps that feel the most comfortable. To reduce interference with a user's interaction with the app of their choice, security solutions should be capable of retrofit to existing apps. Solutions that repackage/rewrite existing apps may meet this criterion.

3. For a solution to be sustainable, it should be easy to maintain and scalable. The solution should be sufficiently general-purpose, require minimal effort to support new apps, and withstand at least minor app updates, if not full version changes.

In the past, email was one a few viable means of electronic communication. Protecting email communications should be relatively straightforward because email protocols (e.g., POP and IMAP) are well defined. Custom privacy-preserving apps may therefore, in theory, be built to serve this need. However, with the introduction of PCS and new varied forms of electronic communications, a good solution should also be able to integrate security features into apps without requiring reverse engineering of the apps' logic or network protocols, which may be undocumented or proprietary (see Skype™ or WhatsApp®, for example).

As described herein, implementations of the disclosed technology include techniques for improving data privacy in mobile communications over public cloud services (PCS). According to certain implementations, a privacy-preserving system, referred to herein as "M-Ageis," may mimic the look and feel of existing apps to preserve their user experience and workflow on mobile devices, without changing the underlying OS or modifying/repackaging existing apps.

Certain implementations of the disclosed technology may meet all or some of the above-described goals by operating at a conceptual layer referred to herein as "Layer 7.5" (also "L-7.5" or "7.5"). In some implementations, Layer 7.5 may operate above the existing application layer (e.g., OSI Layer 7), and interact directly with the user (popularly labeled as Layer 8).

From a system's perspective, L-7.5 may include a transparent window or pane in an isolated process that interposes itself between Layer 7 and Layer 8. The interconnectivity between these layers may be achieved using the accessibility framework, an essential feature on many modern operating systems. In some implementations, L-7.5 may extract the GUI information of an app below it through the OS's user interface automation/accessibility (UIA) library. In other implementations, it may extract the UI information directly from the operating system (OS).

Using this information, an example implementation may be able to proxy user input by rendering its own overlay GUI and subsequently handle user input, for example, to process plaintext data or intercept a user's button click. In some implementations, the overlay GUI may be indicated with a different color, or other visual cue, to let the user know the system is running.

L-7.5 may also programmatically interact with various UI components of the app below on behalf of the user, as described herein. Since many major software vendors today have pledged their commitment towards continuous support and enhancement of accessibility interface for developers, this UIA-based technique (or, the OS-based technique) is likely to remain applicable and sustainable on all major platforms.

From a security design perspective, certain implementations may support two privacy objectives during a user's interaction with a target app: (1) all input from the user may go first to L-7.5 (and be optionally processed) before being passed to an app. This means that confidential data and user intent may be fully captured; and (2) all output from the app may go through L-7.5 (and is optionally processed) before being displayed or otherwise presented to the user.

From a developer's perspective, according to certain implementations, accessing and interacting with a target app's UI components at L-7.5 may be similar to that of manipulating the DOM tree of a web app using JavaScript. While DOM tree manipulation only works for browsers, UIA and OS UI support may work for all apps on a platform. To track the GUI of an app, some implementations may rely on resource ID names available through the UIA library. Other implementation may rely on information extracted from the OS.

Therefore, certain implementations may be resilient to updates that change the look and feel of the app (e.g. position, color, sizing, etc. of UI elements). Some implementations only requires resource ID names to remain the same, which, through empirical evidence, often holds true even through significant version changes. Even if a resource ID changes, minimal effort may be required to rediscover resource ID names and remap them to the corresponding logic. Accordingly, some implementations will not require developer update to continue normal function after updates to the target app.

From a user's perspective, according to certain implementations, the custom GUI may be visible as an always-on-top button or other widget. When it is turned on, users may perceive that they are interacting with the original app in plaintext mode. A lone noticeable difference may be that the GUI of the original app may appear in a different color to indicate that protection is activated. This means that subtle features that contribute towards the entire user experience such as spell checking and in-app navigation may be preserved. Despite user perception, however, the underlying app may never actually receive plaintext data.

Figure 2:
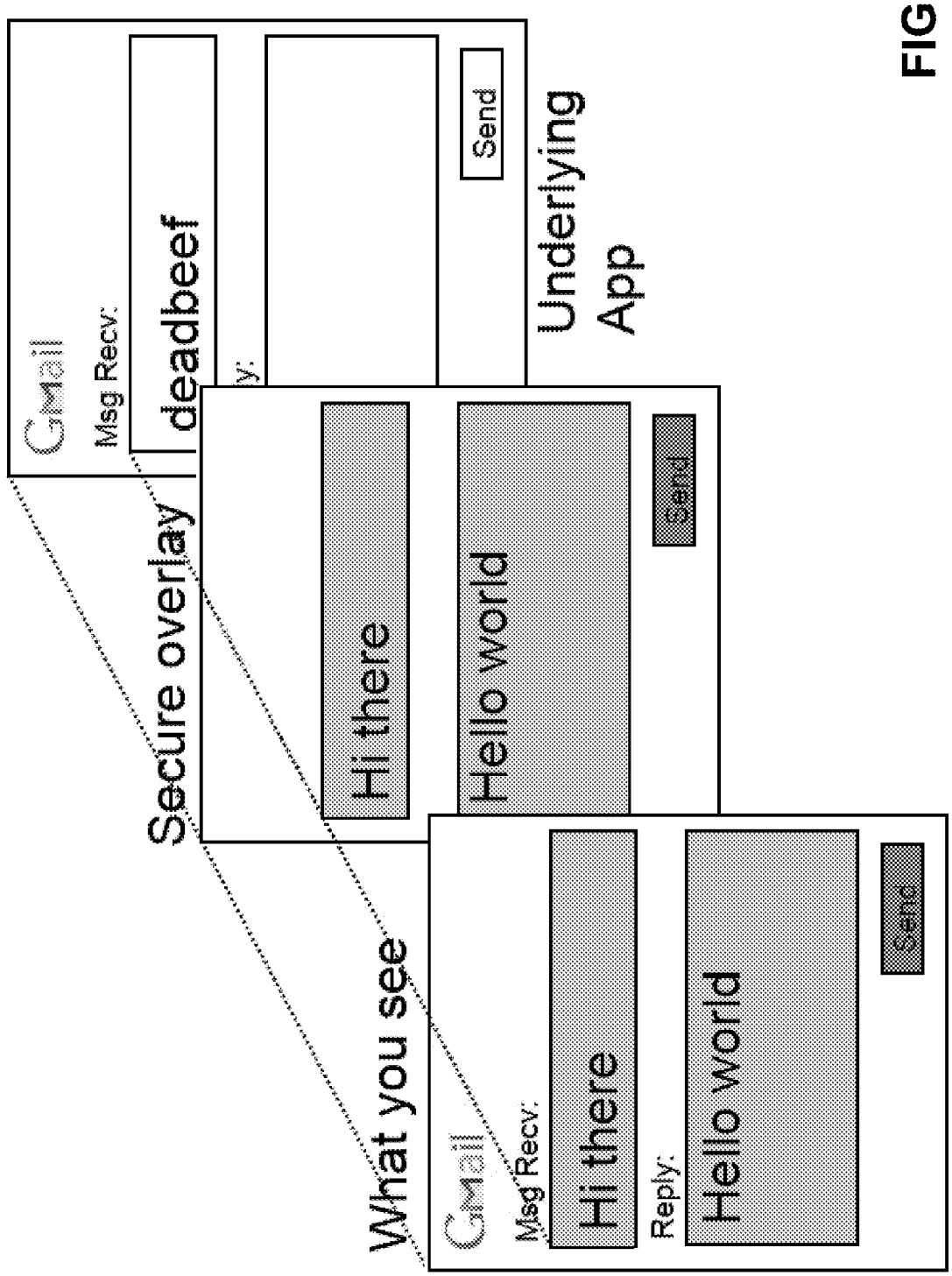
FIG. 2 depicts a flow diagram of a transformation 200 of plaintext to ciphertext, according to an example implementation.

FIG. 2 depicts a flow diagram of a transformation 200 of plaintext to ciphertext, according to an example implementation. In FIG. 2, M-Aegis uses L-7.5 to transparently reverse-transform the message "deadbeef" into "Hi there." The system may also allow a user to enter their plaintext message "Hello world" into M-Aegis's text box. To the user, the overlay GUI may look exactly or near-exactly like the original app. When the user decides to send a message, the "Hello world" message may be transformed and relayed to the underlying app.

Threat Model and Architecture

According to certain implementations, there are three parties that may pose a threat to the confidentiality of users' data exposed to public cloud through mobile devices. Therefore, these parties are assumed to be untrustworthy in the corresponding threat model:

1. Public cloud service (PCS) providers. Sensitive data stored in the public cloud may be compromised in several ways. For example, (a) PCS providers maybe compelled by law to provide access to a user's sensitive data to law enforcement agencies; (b) the business model of PCS providers creates strong incentive for them to share/sell user data with third parties; (c) PCS administrators who have access to the sensitive data may compromise the data, either intentionally, or by accident/negligence; and (d) vulnerabilities of the PCS are exploitable by attackers to exfiltrate sensitive data.

2. Client-side apps. Since client-side apps are often provided by PCS providers to allow a user to access their services, it follows that these apps also may be considered untrustworthy.

3. Middle boxes between a PCS and a client-side app. Sensitive data may also be compromised when it is transferred between a PCS and a client-side app. Incorrect protocol design/implementation may allow attackers to eavesdrop on plaintext data or perform Man-in-the-Middle attacks.

Certain implementations may mitigate or avoid some or all of the above threats by using L-7.5 to facilitate end-to-end encryption (E2EE) for user private data. In some implementations, the following components may form, or be included in, the trusted computing base (TCB): the hardware (see, e.g., FIG. 1), the OS 124, and the framework that controls and mediates access to hardware. In the absence of physical input devices (e.g., mouse and keyboard), the soft keyboard may be additionally trusted to not leak the keystrokes of a user. The TCB is relied upon to correctly handle I/O, and to provide proper isolation between M-Aegis and untrusted components. In some implementations, it is further assumed that all the components of the system, including the L-7.5 that it creates, are trusted. Finally, the user may be considered trusted in his intent. This means that the user may be trusted to turn on or activate implementations of the disclosed technology when he wants to protect the privacy of his data during his interaction with PCS.

Certain implementations are architected to fulfill some or all of the design goals described hereinabove. To achieve a strong isolation, some implementations may execute in a separate process although residing in the same OS as the target client app (TCA). Besides memory isolation, the file system may be also shielded from other apps by OS app sandbox protection. Should a greater degree of isolation be desirable, an underlying virtual-machine-based system may be adopted to provide even stronger security guarantees.

According to certain implementations, some of the main components that make up M-Aegis include:

Layer 7.5 (L-7.5). Certain implementations may interpose a novel conceptual layer called Layer 7.5 between the user and the TCA. This may allow the introduction of true end-to end encryption (E2EE) without exposing plaintext data to the TCA, and all while maintaining the TCA's original functionalities and user experience, according to the second design goal. L-7.5 may be implemented by creating a transparent window that is always on top of the UI (or maintains UI focus). This technique may be advantageous in that it provides a natural way to handle user interaction, thus preserving user experience without the need to reverse engineer the logic of TCAs or the network protocols used by the TCAs to communicate with their respective cloud service back-ends, fulfilling the third design goal.

According to certain implementations, there may be three cases of user interactions to handle. The first case includes interactions that do not involve data confidentiality, such as deleting or relabeling email. Such input may not require extra processing or transformation, and may be directly delivered to the underlying TCA. Such click-through behavior is a natural property of transparent windows, and helps the system maintain the look and feel of the TCA.

Figure 4:
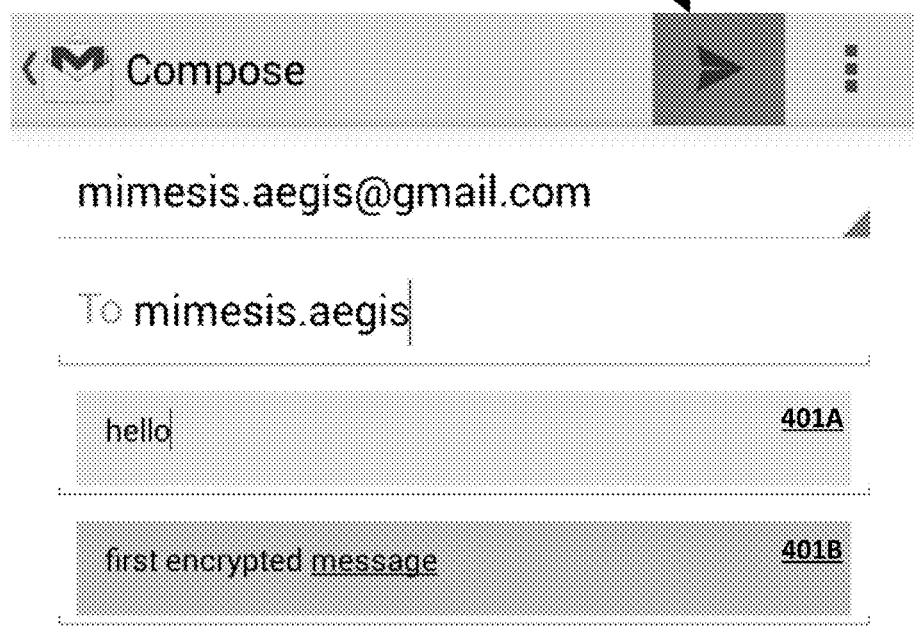
FIG. 4 depicts an illustration of an email app interface 400 with mimic GUIs 401A 401B indicated in different colors.
Figure 4:
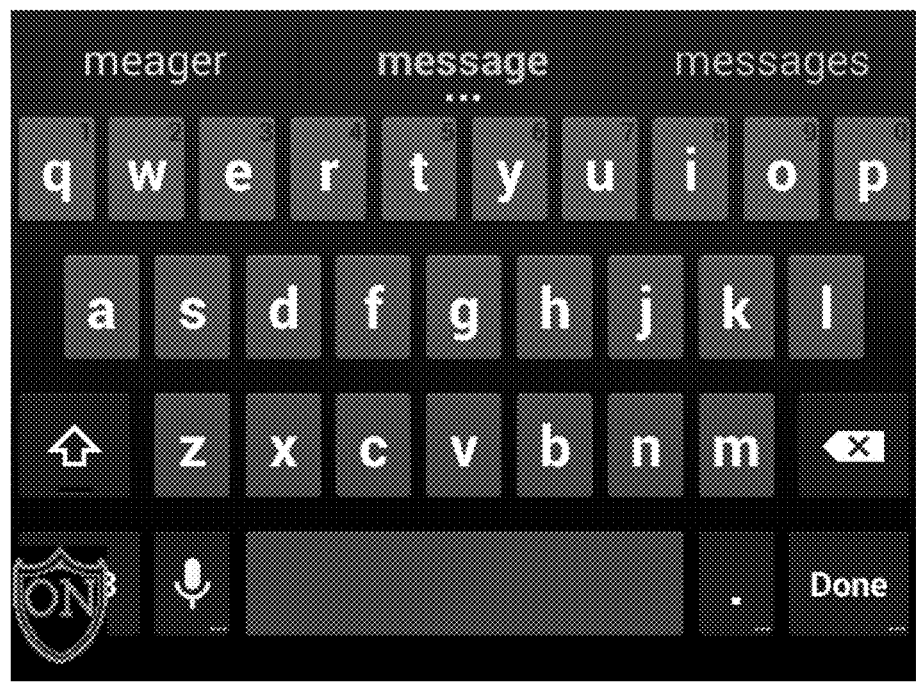

The second case considers interactions that involve data confidentiality, such as entering messages or searching encrypted email. Such input may require extra processing (e.g., encryption and encoding operations). For such cases, the system may place overlay GUIs that "mimic" the app GUIs over the TCA, which are purposely painted in different colors for two reasons: (1) as a placeholder for user input so that it does not leak to the TCA, and (2) for user visual feedback. Mimic GUIs for the subject 401A and content 401B as seen in FIG. 4 are such examples. Since L-7.5 is always on top, this may provide a strong guarantee that user input will always go to a mimic GUI instead of the TCA.

The third case considers interactions with control GUIs (e.g., send message buttons). Such input may require user action to be "buffered" while the input from the second case is being processed, before being relayed to the actual control GUI of the TCA. For such cases, the system may create semi-transparent mimic GUIs that register themselves to absorb/handle user clicks/taps. Again, these mimic GUIs may be painted with a different color to provide a visual cue to a user. Examples of these include the purple search button 305 in the left figure in FIG. 3 and the purple send button 405 in FIG. 4.

UI Manager (UIM). According to certain implementations, there are certain capabilities the system may require to be fully functional that are not commonly available to normal apps. First, although the system may be confined within the OS' app sandbox, it should be able to determine with which TCA the user is currently interacting. This allows the system to invoke specific logic to handle the TCA, and helps the system clean up the screen when the TCA is terminated. Second, the system may require information about the GUI layout for the TCA it is currently handling. This allows the system to properly render mimic GUIs on L-7.5 to intercept user I/O. Third, although isolated from the TCA, the system should be able to communicate with the TCA to maintain functionality and ensure user experience is not disrupted. For example, the system should be able to relay user clicks (or other gestures or input events) to the TCA, eventually send encrypted data to the TCA, and click or otherwise interact with the TCA's button or widget on behalf of the user. For output on screen, the system should be able to capture ciphertext so that it can decrypt it and then render it on L-7.5.

In some implementations, the system may extract certain features from the underlying OS's accessibility framework, which may be exposed to developers in the form of the User Interface Accessibility/Automation (UTA) library, or from the OS directly without the help of the UTA library. Using UTA or direct OS support, the system may be not only able to know which TCA is currently executing, but may query the GUI tree of the TCA to get detailed information about how the page is laid out (e.g., location, size, type, and resource ID of the GUI components). More importantly, the system may be able to obtain information about the content of these GUI items.

Exploiting UIA or OS support may be advantageous to this design as compared to other methods of information capture from the GUI such as optical character recognition (OCR). However, such methods may be used alternatively, or in conjunction with UIA or OS probing in certain implementations. In addition to having virtually perfect content capture accuracy, the UIA-based or OS-based techniques are not limited by screen size. For example, FIG. 3 depicts an illustration of an email app interface when the system is active 300A, and when the system is inactive 300B, respectively, according to an example implementation. Even though the screen size may prevent the full text from being displayed, M-Aegis is still able to capture text in its entirety through the UIA libraries or OS support, permitting the system to apply decryption to ciphertext. These capabilities and advantages were used to build a crucial component of system called the UI manager (UIM).

Per-TCA Logic

According to certain implementations, the system may be extended to support many TCAs. For each TCA of interest, per-TCA logic may be built as an extension module. The per-TCA logic may be responsible for rendering the specific mimic GUIs according to information it queries from the UIM. Therefore, per-TCA logic may be responsible for handling direct user input. Specifically, the logic may decide whether the user input will be directly passed to the TCA or be encrypted and encoded before doing so. This may ensure that the TCA does not obtain plaintext data while user interaction is in plaintext mode. Per-TCA logic may also intercept button clicks so that it may then instruct UIM to emulate the user's action on the button in the underlying TCA. Per-TCA logic may also decide which encryption and encoding scheme to use according to the type of TCA it is handling. For example, encryption and encoding schemes for handling email apps may differ from that of messenger apps.

Cryptographic Module. According to certain implementations, the system's cryptographic module may be responsible for providing encryption/decryption and cryptographic hash capabilities to support the searchable encryption scheme to the per-TCA logic, thereby enabling the system to transform/obfuscate messages through E2EE operations. Besides standard cryptographic primitives, this module may also include a searchable encryption scheme to support search over encrypted email that works without server modification. Since the discussion of any encryption scheme is not complete without encryption keys, the key manager may also be a part of this module.

Key Manager. In some implementations, the system may have a key manager per TCA that manages key policies that may be specific to each TCA according to user preference. The key manager may support a range of schemes, including simple password-based key derivation functions (which may be shared out of band) to derive symmetric keys, to more sophisticated PKI-based schemes for users who prefer stronger security guarantees and do not mind the additional key set-up and exchange overheads. Techniques for key management/distribution are known in the art and not discussed at length herein.

Searchable Encryption Scheme (EDESE). Numerous conventional encryption schemes support keyword search. These schemes exhibit different tradeoffs between security, functionality and efficiency, but all of them require modifications on the server side. Since server cooperation may not be assumed, a new searchable encryption scheme was designed called easily deployable efficiently-searchable symmetric encryption scheme (EDESE). EDESE is an adaptation of a scheme proposed by Bellare et al. with modifications similar to that of Goh's scheme, and is retrofittable to a non-modifying server scenario.

In some implementations, EDESE may be incorporated for email applications. The idea for the construction is simple: the document is encrypted with a standard encryption scheme and HMACs appended of unique keywords in the document. To prevent leaking the number of unique keywords, as many "dummy" keywords are added as needed.

According to certain implementations, in order to achieve higher storage and search efficiency, a Bloom filter (BF) may be used to represent the EDESE index. Basically, a BF is a data structure that allows for efficient set-inclusion tests. However, such set-inclusion tests based on BFs are currently not supported by existing email providers, which only support string-based searches. Therefore, a solution was devised that encodes the positions of on-bits in a BF as Unicode strings.

When the underlying data structure that is used to support EDESE is a BF, search operations may be susceptible to false positives matches. However, this does not pose a real problem to users, because the false positive rate may be extremely low and is completely adjustable. In one implementation, the parameters are as follows: the length of keyword (in bits) is estimated to be k=128, the size of the BF array is $B=2^{24}$, the maximum number of unique keywords used in any email thread is estimated to be $d=10^6$, the number of bits set to 1 for one keyword is r=10. Plugging these values into the formula for false positive calculation, i.e., $(1-e^{-rd/B})^r$ the probability of a false positive δ may be capped to 0.0003.

User Workflow

The following workflow illustrates operation of an example implementation of the system for a user composing and sending an email using the stock Gmail™ app on Android™.

1. When the user launches the Gmail™ app, the UIM notifies the correct per-TCA logic of the event. The per-TCA logic will then initialize itself to handle the Gmail™ workflow.

2. Responsive to Gmail™ being launched, the per-TCA logic will try to detect the state of Gmail app (e.g., preview, reading, or composing email). This allows M-Aegis to properly create mimic GUIs on L-7.5 to handle user interaction. For example, when a user is on the compose page, the per-TCA logic will mimic the GUIs of the subject and content fields, as seen in FIG. 4, 401A-B. The user then interacts directly with these mimic GUIs in plaintext mode without extra effort. Thus, the workflow is unmolested. Note that essential but subtle features like spell check and auto-correct are still preserved, as they may be innate features of the mobile device's soft keyboard. Additionally, the "send" button is also mimicked to capture user intent.

(3) As the user finishes composing his email, he clicks on the mimicked "send" button on L-7.5. Since L-7.5 receives the user input and not the underlying Gmail app, the per-TCA logic is able to capture this event and proceed to process the subject and the content.

Figure 5:
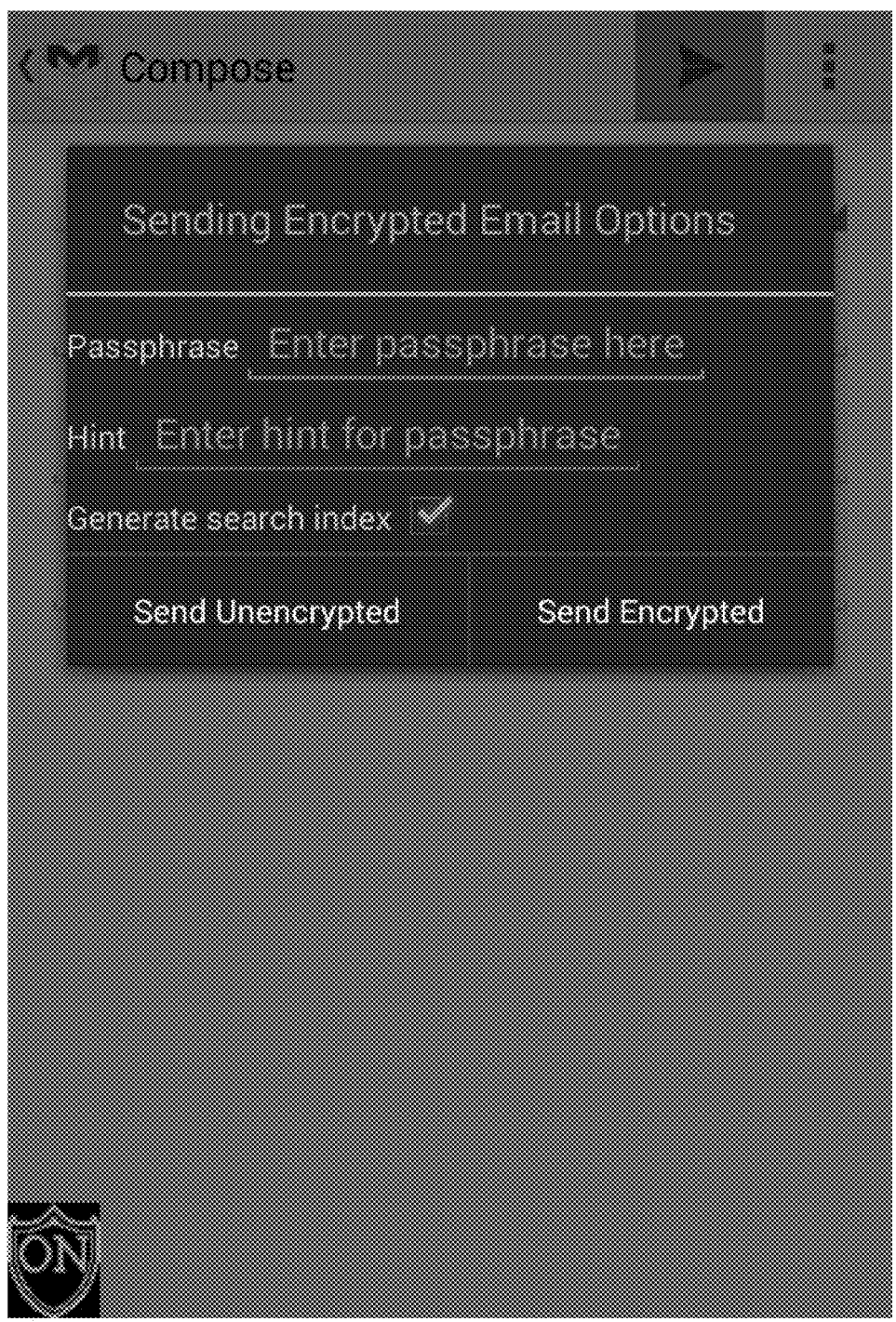
FIG. 5 depicts an illustration of a password prompt interface 500, according to an example implementation.

(4) The per-TCA logic selects the appropriate encryption key to be used based on the recipient list and the predetermined key policy for Gmail™. If a key cannot be found for this conversation, M-Aegis prompts the user (as shown in FIG. 5) for a password to derive a new key. After obtaining the associated key for this conversation, M-Aegis will then encrypt these inputs and encode it back to text such that Gmail™ can consume it.

(5) The per-TCA logic requests the UIM to fill in the corresponding GUIs on Gmail™ with the transformed text. After they are filled, the UIM is instructed to click the actual "send" button on behalf of the user. This provides a transparent experience to the user.

From this example workflow, it should be evident that from the user's perspective, the workflow of using Gmail™ remains the same, because of the mimicking properties of M-Aegis.

Example Implementation

An example of M-Aegis was implemented using Java® on Android™, as an accessibility service. This was done by creating a class that extends the AccessibilityService class and requesting the BIND ACCESSIBILITY SERVICE permission in the manifest. This allowed interfacing with the UTA library, for building the UIM.

This example implementation of M-Aegis was deployed on two Android phones from separate manufacturers, the Samsung Galaxy® Nexus™ and LG® Nexus™ 4, and targeted several versions of Android™ from Android™ 4.2.2 (API level 17) to Android™ 4.4.2 (API level 19). The deployment was done on stock devices and OS (i.e., without modifying the OS, Android framework, or "rooting"). Only simple app installation was performed. This demonstrates the ease of deployment and distribution of the solution. Another prototype was implemented on Windows® 7 to demonstrate interoperability and generality of approach, but is not discuss at length herein.

As an interface to the user, a button was created that is always on top even if other apps are launched. This allowed the creation of a non-bypassable direct channel of communication with the user in addition to providing a visual cue of whether M-Aegis is turned on or off. For app support, Gmail™ was used as an example of an email app and WhatsApp® as an example of a messenger app.

Cryptographic Schemes. For encryption/decryption operations, AES-GCM-256 was used. For a password-based key generation algorithm, PBKDF2 with SHA-1 was used as the keyed-hash message authentication code (HMAC). HMAC-SHA-256 was also used as the HMAC to generate tags for email messages. These functionalities are available in Java's javax.crypto and java.security packages.

For the sake of usability, a password-based scheme was implemented as the default, and one password was assumed for each group of message recipients. The users were relied upon to communicate the password to the receiving parties using an out-of-band channel (e.g., in person or via phone call). For messaging apps, an authenticated Diffie-Hellman key exchange protocol was implemented to negotiate session keys for WhatsApp® conversations. A PGP key was automatically generated for a user during installation based on the hashed phone number, and was deposited to publicly accessible repositories on the user's behalf (e.g., MIT PGP Key Server). Since all session and private keys were stored locally for user convenience, it was ensured that they were never saved to disk in plaintext. The keys were additionally encrypted with a key derived from a master password that is provided by the user during installation.

UIM. As mentioned earlier, UIM may be implemented using UIA libraries or direct OS support. On Android, events that signify something new being displayed on the screen may be detected by monitoring following the events: WINDOW CONTENT CHANGED, WINDOW STATE CHANGED, and VIEW SCROLLED. Upon receiving these events, per-TCA logic may be informed. The UIA library may present a data structure in the form of a tree with nodes representing UI components with the root being the top window. This may allow the UIM to locate all UI components on the screen.

Figure 6:
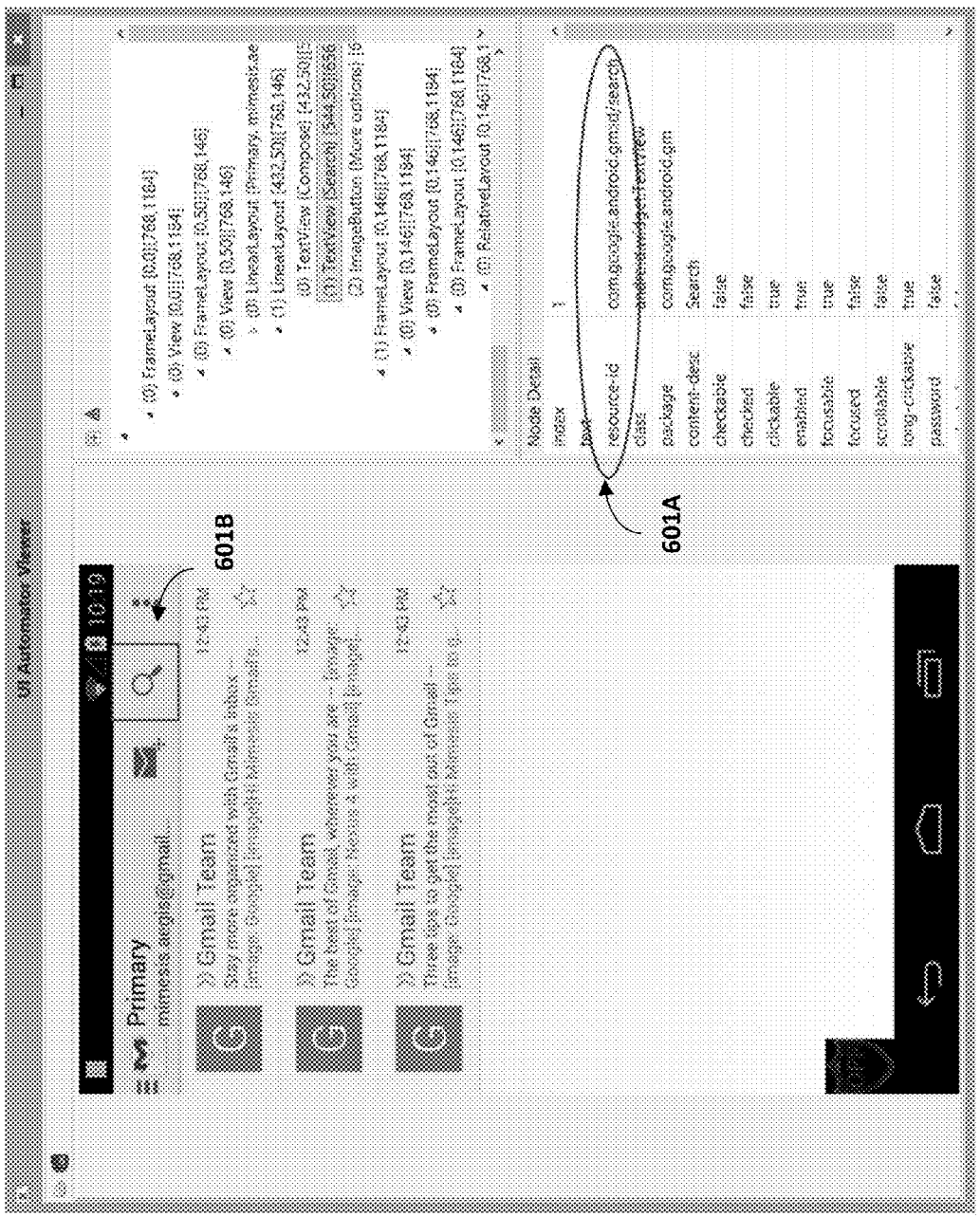
FIG. 6 depicts an illustration of the UI Automator Viewer interface 600, according to an example implementation.

Additionally, Android's UIA framework also provides the ability to query for UI nodes by providing a resource ID. For instance, the node that represents search button of Gmail™ can be found by querying for com.google.android.gm:id/search. More importantly, there may be no need to guess the names of these resource IDs. Rather, tools can be used to view the tree, such as UI Automator Viewer, which comes with the default Android SDK. FIG. 6 depicts an illustration of the UI Automator Viewer interface 600, according to an example implementation. The UI Automator Viewer presents an easy to use interface to examine the UTA tree and determine the resource ID 601A associated with a GUI element of interest 601B.

Once the node of interest is found, all the other information about the GUI represented by the node may be found. This may include the exact location and size of text boxes, buttons, and other widgets on the screen.

The system may be able to programmatically interact with various GUIs of a TCA using the function performAction( ). This may allow the system to click on or otherwise interact with a TCA's button on the user's behalf.

L-7.5. Layer 7.5 was implemented on Android™ as specific types of system windows, which are always-on-top of other running apps. Android™ allows the creation of various types of system windows. Two system windows, TYPE SYSTEM OVERLAY and TYPE SYSTEM ERROR were the focus here. The first system window is for display only and allows all tap/keyboard events to go to underlying apps. In contrast, the second type allows for user interaction. Android allows the use of any View objects for either type of window, and this was used to create the mimic GUIs, and set their size and location.

The mimic GUIs were intentionally created in different colors as a subtle visual cue to the users that they are interacting with M-Aegis, without distracting them from their original workflow.

Per-TCA Logic. The general procedure for development of TCA logic was as follows:

(1) Understand what the app does. This knowledge allows identification of which GUIs need to be mimicked for intercepting user I/O. For text-based TCAs, this may be a trivial step because the core functionalities that M-Aegis needs to handle are limited and thus easy to identify, e.g. buffering user's typed texts and sending them to the intended recipient.

(2) Using UI Automator Viewer, examine the UTA tree for the relevant GUIs of a TCA and identify signatures (GUI resource IDs) for each TCA state. UI Automator Viewer allows inspection of the UTA tree through a graphical interface (as shown in FIG. 6), which reduces development time. UI components may be relied upon that are unique to certain states (e.g., the "send" button signifies presence in the compose state).

(3) For each relevant GUI, algorithms are devised to extract either the location or content of ciphertext (for decryption and display), or the type, size, and location of GUIs that need to be mimicked (e.g., the subject and content boxes in the Gmail™ compose UI). Again, this may be performed through UI Automator Viewer. For example, for the Gmail™ preview state, the UIA may be queried for nodes with ID com.google.android.gm:/id/conversation list to identify all the UIA nodes corresponding to the preview item of each individual email, and from those all ciphertext may be extracted on the preview window through the UIA.

(4) Create event handlers for controls mimicked on L-7.5. For the Gmail™ compose state, click/touch events are listened for on the L-7.5 "send" button, the email encryption process described herein is performed, and the ciphertext is sent to the underlying TCA.

(5) Identify ways that each relevant state can be updated. Updates may be handled via the following method: clear L-7.5, extract all necessary information from the new state, and render again. This may be equivalent to redrawing all GUIs on L-7.5 based on the detected state.

There are least two details worth considering when developing per-TCA logic. First, careful consideration should be given about the type of input data fed to TCAs. Since most TCAs only accept input data in specific formats (e.g., text), they do not support the input of random byte sequences as valid data. Therefore, encrypted data should be encoded into text format before feeding it as input to a TCA. Conventionally, base64 encoding is used for this purpose. However, base64 encoding may consume too much on-screen real estate. To overcome this, the binary encrypted data was encoded into Chinese Japanese Korean (CJK) Unicode characters, which have efficient on-screen real estate consumption. To map the binary data into the CJK plane, the encrypted data may be processed at the byte granularity. For each byte, its value is added to the base of the CJK Unicode representation, i.e., 0x4E00. For example, byte 0x00 may be encoded as "一", and byte 0x01 will be represented as "丁".

Second, the system should be able to differentiate between ordinary messages and encrypted messages. Markers were introduced into the encrypted data after encoding; in particular, the subject and contents of a message were wrapped using a pair of curly braces (i.e., "{", . . . , "}").

Email Apps. In this subsection and the next, implementation details specific to the email and messenger classes of apps are respectively described, including the message format created for each class.

Support for Gmail™ was implemented on the prototype as a representative app of email category. Two custom formats were created to communicate the necessary metadata to support M-Aegis' functionalities:

Subject: {Encode(ID$_{Key}$||IV||Encrypt(Subject))}
Content: {Encode(Encrypt(Content)||Tags)}

Once challenge faced in supporting decryption during the Gmail™ preview state is that only the beginning parts of both the title and the subject of each message may be available. Also, the exact email addresses of the sender and recipients are not always available, as some are displayed as aliases, and some are hidden due to lack of space. The lack of such information makes it difficult to automatically decrypt the message even if the corresponding encryption key actually exists on the system.

To address these problems, when a message is encrypted, a key-ID (IDKey) was included in the subject field (as seen in the format description above). Note that since the key-ID is not a secret, it need not necessarily be encrypted. This way, all the needed information is present to decrypt correctly the subtext displayed on the Gmail™ preview.

The Tags field was a collection of HMAC digests that are computed using the conversation key and keywords that exist in a particular email. It was then encoded and appended as part of the content that Gmail™ receives to facilitate encrypted search without requiring modification to Gmail™ servers.

Messenger Apps. Support for WhatsApp® was implemented on the prototype as a representative app of this category. The format created for this class of apps was simple, as seen below:

Message: {Encode(IV||Encrypt(Message))}

Example Methods

Figure 7:
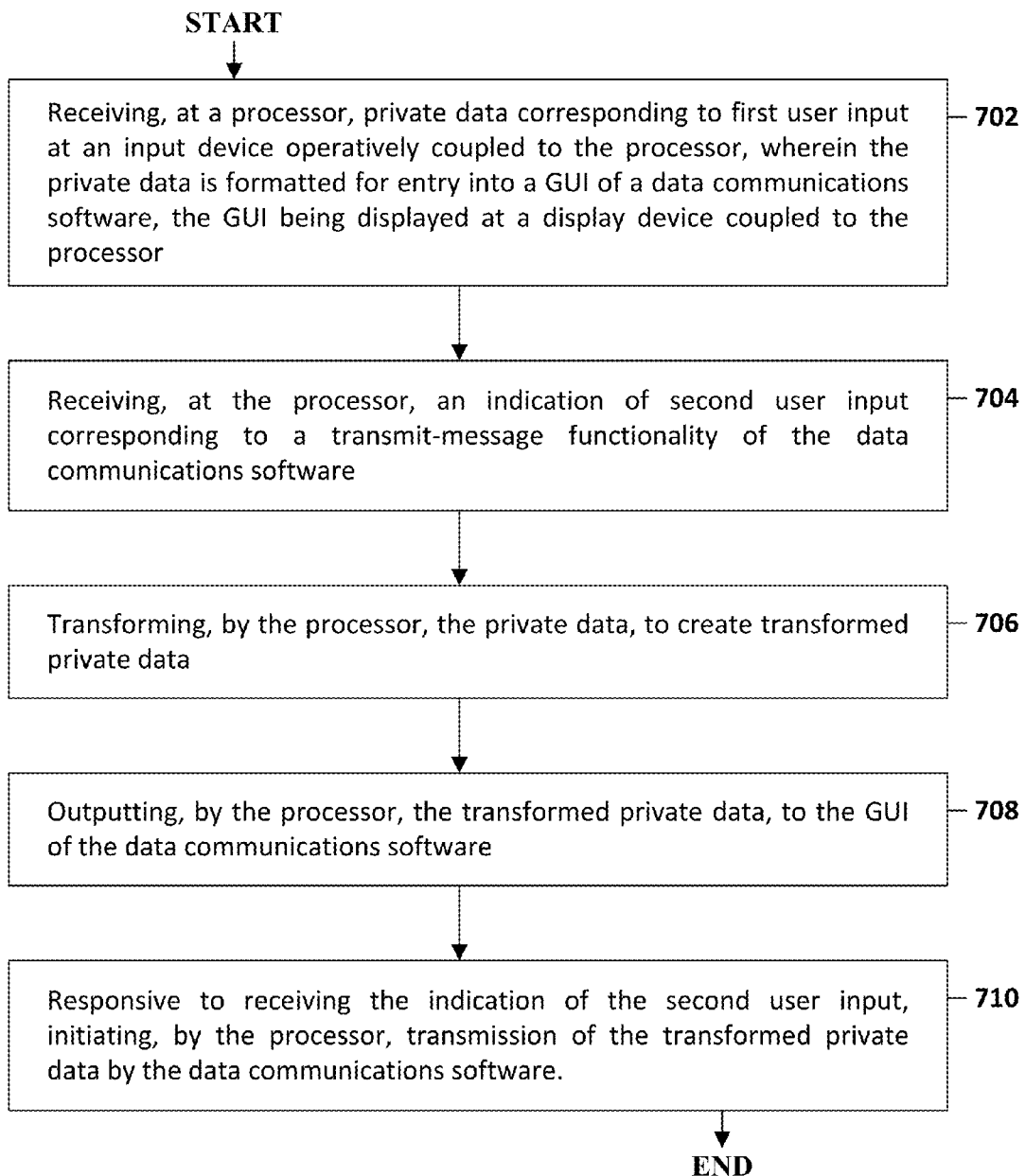
FIG. 7 depicts a flow diagram of a method 700, according to an example implementation.

FIG. 7 depicts a flow diagram of a method 700, according to an example implementation. As shown in FIG. 7, the method 700 starts in block 702, and, according to an example implementation, includes receiving, at a processor, private data corresponding to first user input at an input device operatively coupled to the processor, wherein the private data is formatted for entry into a GUI of a data communications software, the GUI being displayed at a display device coupled to the processor. In block 704, the method 700 includes receiving, at the processor, an indication of second user input corresponding to a transmit-message functionality of the data communications software. In block 706, the method 700 includes transforming, by the processor, the private data, to create transformed private data. In block 708, the method 700 includes outputting, by the processor, the transformed private data, to the GUI of the data communications software. In block 710, the method 700 includes, responsive to receiving the indication of the second user input, initiating, by the processor, transmission of the transformed private data by the data communications software.

FIG. 8 depicts a flow diagram of another n method 800, according to an example implementation. As shown in FIG. 8, the method 800 starts in block 802, and, according to an example implementation, includes presenting, over a textual communications app GUI being displayed by the mobile computing device, an overlay GUI comprising at least one user interface element overlaying a portion of the textual communications app GUI for receiving textual data. In block 804, the method 800 includes receiving, at the at least one processor, plaintext data corresponding to first user input received at the mobile computing device, wherein the textual data is formatted for entry into the portion of the textual communications app GUI for receiving textual data. In block 806, the method 800 includes encrypting, by the at least one processor, the plaintext data, to create ciphertext data. In block 808, the method 800 includes receiving, at the at least one processor, an indication of second user input received at the mobile computing device, the second user input corresponding to a transmit-message functionality of the textual communications app. In block 810, the method 800 includes directing, by the at least one processor, the ciphertext data, to the GUI of the textual communications app. In block 812, the method 800 includes, responsive to receiving the indication of the second user input, initiating, by the processor, transmission of a first message including the ciphertext data by the textual communications app.

It will be understood that the various steps shown in FIGS. 7-8 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
   providing a device comprising a hardware processor, a display device operatively coupled to the hardware processor, and an input device operatively coupled to the hardware processor;
   executing, at the hardware processor, a first process comprising privacy software;
   identifying, by the privacy software, a graphical user interface of data communication software displayed at the display device, the graphical user interface comprising a user interface element configured to receive a first user input and formatted to be displayed at the display device, wherein the data communication software is in a second process, and the first process and the second process are separate processes;
   receiving, at the hardware processor, private data corresponding to the first user input at the input device, wherein the private data is formatted for entry into the user interface element of the data communications software, the user interface element being displayed at the display device coupled to the hardware processor;
   receiving, at the hardware processor, an indication of a second user input corresponding to a transmit-message functionality of the data communications software;
   transforming, by the hardware processor in the privacy software process, the private data to create transformed private data;
   outputting, by the hardware processor, the transformed private data to the user interface element of the data element; and
   responsive to receiving the indication of the second user input, initiating, by the hardware processor, transmission of the transformed private data by the data communications software.

2. The method of claim 1, further comprising:
   displaying, at the display device, an overlay user interface element oriented over the user interface element of the data communications software, wherein the private data corresponding to the first user input is received by the overlay user interface element, and the transformed private data is output to a portion of the user interface element of the data communications software for receiving private data.

3. The method of claim 2, wherein the overlay user interface element overlays the user interface element.

4. The method of claim 3, wherein the overlay user interface element mimicks the appearance of the user interface element of the data communications software, and wherein the overlay user interface element is visually differentiated from the mimicked user interface element by color.

5. The method of claim 1, further comprising:
   displaying, at the display device, an overlay graphical user interface oriented over the graphical user interface of the data communications software and comprising at least one user interface element mimicking an appearance of, and overlaying, a portion of the graphical user interface of the data communications software for initiating the transmit-message functionality, wherein the second user input is received at the at least one user interface element of the overlay graphical user interface.

6. The method of claim 1, wherein transforming the private data includes encrypting the private data to create encrypted private data, and the transformed private data includes an indication of the encrypted private data.

7. The method of claim 1, wherein the hardware processor is associated with a first computing device and the transformed private data is a first transformed private message, and the method further comprises:
   obtaining, from the [graphical user interface, a second transformed private message, wherein the second transformed private message is received by the first computing device and represents private data transformed at a hardware processor of a second computing device remote from the first computing device;
   reverse-transforming, by the hardware processor associated with the first computing device, the second transformed private data, to create second private data; and outputting, for display at the display device, an indication of the second private data.

8. The method of claim 7, further comprising:
outputting, for display at the display device, an overlay graphical user interface oriented over the graphical user interface, the overlay graphical user interface comprising an overlay user interface element that is configured to display private data and that is overlaying the user interface element, wherein the indication of the second private data is displayed in the overlay user interface element.

9. The method of claim 1, wherein the private data comprises at least one of email, instant message, video, and voice data.

10. A non-transitory computer-readable medium that stores instructions that, when executed by a hardware processor of a mobile computing device, causes the mobile computing device to perform a method comprising:
providing, at the hardware processor, a first process comprising an overlay graphical user interface;
identifying a second process comprising a textual communications app including a graphical user interface, wherein the first process and the second process are separate processes;
presenting, over the textual communications app graphical user interface being displayed by the mobile computing device, the overlay graphical user interface comprising at least one user interface element overlaying a portion of the textual communications app graphical user interface that is configured to receive textual data;
receiving, at the hardware processor, first plaintext data corresponding to a first user input received at the mobile computing device, wherein the textual data is formatted for entry into the portion of the textual communications app graphical user interface that is configured to receive textual data;
encrypting, by the hardware processor, the first plaintext data to create first ciphertext data;
receiving, at the hardware processor, an indication of a second user input received at the mobile computing device, the second user input corresponding to a transmit-message functionality of the textual communications app;
directing, by the hardware processor, the first ciphertext data to the graphical user interface of the textual communications app; and
responsive to receiving the indication of the second user input, initiating, by the hardware processor, transmission of a first message including the first ciphertext data by the textual communications app.

11. The non-transitory computer-readable medium of claim 10, further comprising instructions that, when executed by a hardware processor of a mobile computing device, causes the mobile computing device to perform the additional steps of:
receiving, by the textual communications app, a second message including second ciphertext data from a remote computing device;
receiving, by the hardware processor and from the textual communications app graphical user interface, the second ciphertext data;
decrypting, by the hardware processor, the second ciphertext data of the second message to reveal second plaintext data associated with the second message; and
displaying, by the computing device, an indication of the second plaintext data associated with the second message.

12. The non-transitory computer-readable medium of claim 10, further comprising instructions that, when executed by a hardware processor of a mobile computing device, causes the mobile computing device to perform the additional steps of:
receiving, by the textual communications app, a second message including second ciphertext data from a remote computing device;
obtaining, by the hardware processor and from the textual communications app graphical user interface, a portion of the second message including an associated ID tag and at least a portion of the second ciphertext data;
decrypting, by the hardware processor, based on a key corresponding to the ID tag, the at least a portion of the second ciphertext data to reveal second plaintext data associated with the second message; and
displaying, by the computing device, an indication of the second plaintext data associated with the second message.

13. The non-transitory computer-readable medium of claim 10, wherein the textual communications app is a client app for accessing a public cloud service.

14. The non-transitory computer-readable medium of claim 10, wherein the first message is an email or an instant message.

15. A system comprising:
a memory operatively coupled to a hardware processor and configured for storing data and instructions that, when executed by at the hardware processor, cause the system to perform a method, the method comprising:
executing a first process comprising an overlay graphical user interface for intercepting user input;
identifying a second process comprising a target client app, wherein the first process and the second process are separate processes;
presenting, over a graphical user interface of the target client app being displayed by a mobile computing device, the overlay graphical user interface, wherein the overlay graphical user interface comprises a user interface element mimicking the appearance of, and overlaying, a portion of the graphical user interface of the target client graphical user interface that is configured to receive private data;
receiving, at the hardware processor, plaintext data corresponding to first user input received at the mobile computing device, wherein the private data is formatted for entry into the portion of the target client app graphical user interface that is configured to receive private data;
encrypting, by the hardware processor, based on a cryptographic key, the plaintext data, to create ciphertext data;
receiving, at the hardware processor, an indication of second user input received at the mobile computing device, the second user input corresponding to a transmit-message functionality of the target client app;
directing, by the hardware processor, the ciphertext data, to the graphical user interface of the target client app; and
responsive to receiving the indication of the second user input, initiating, by the hardware processor, transmission of a first message including the ciphertext data by the target client app.

16. The system of claim 15, further comprising logic for configuring the overlay graphical user interface, the method further comprising:
> receiving an indication of a current app being displayed by the mobile computing device; and
> configuring, based on the indication of the current app, the overlay graphical user interface such that the user interface element mimics and overlays the portion of the graphical user interface of the target client app graphical user interface that is configured to receive private data, wherein the current app is the target client app.

17. The system of claim 15, wherein the indication of the current app being displayed comprises graphical user interface configuration data obtained from a user interface automation or user interface accessibility of the mobile computing device or an operating system extension.

18. The system of claim 15, wherein the system runs in an isolated process from the target client app, and transient and permanent data stored in the memory is inaccessible to other client apps.

19. The system of claim 15, wherein the overlay graphical user interface runs in a virtual machine of the mobile computing device.

20. The system of claim 14, wherein the overlay graphical user interface executes on a virtual-reality device that is in communication with the mobile computing device that runs the target client app.

* * * * *